(12) United States Patent
Watarai

(10) Patent No.: US 7,648,211 B2
(45) Date of Patent: Jan. 19, 2010

(54) BICYCLE WHEEL SECURING STRUCTURE

(75) Inventor: Etsuyoshi Watarai, Osaka (JP)

(73) Assignee: Shimano Inc., Osaka (JP)

( * ) Notice: Subject to any disclaimer, the term of this patent is extended or adjusted under 35 U.S.C. 154(b) by 134 days.

(21) Appl. No.: 11/764,977

(22) Filed: Jun. 19, 2007

(65) Prior Publication Data

US 2008/0315678 A1    Dec. 25, 2008

(51) Int. Cl.
*B60B 27/00* (2006.01)
*F16B 21/18* (2006.01)

(52) U.S. Cl. .................. 301/110.5; 301/124.2; 411/517

(58) Field of Classification Search ............. 301/110.5, 301/110.6, 111.03, 111.07, 124.1, 124.2, 301/132; 280/279, 280, 288; 411/517, 530; 403/326; 285/317, 321
See application file for complete search history.

(56) References Cited

U.S. PATENT DOCUMENTS

| | | | |
|---|---|---|---|
| 2,568,834 A * | 9/1951 | Streifthau ....................... 301/1 |
| 5,823,555 A * | 10/1998 | Ashman ..................... 280/279 |
| 6,089,675 A | 7/2000 | Schlanger | |
| 6,435,622 B1 | 8/2002 | Kanehisa et al. | |
| 6,497,314 B2 * | 12/2002 | Kanehisa ..................... 192/64 |
| 7,278,693 B2 * | 10/2007 | Smith et al. ................. 301/113 |
| 2004/0084955 A1 * | 5/2004 | Denby ...................... 301/124.2 |
| 2008/0185908 A1 * | 8/2008 | Hara ....................... 301/124.2 |
| 2008/0211296 A1 * | 9/2008 | Takachi ................... 301/124.2 |

FOREIGN PATENT DOCUMENTS

EP          0 890 505 B1     11/2004

* cited by examiner

*Primary Examiner*—S. Joseph Morano
*Assistant Examiner*—Kip T Kotter
(74) *Attorney, Agent, or Firm*—Global IP Counselors, LLP

(57) ABSTRACT

A bicycle hub includes a wheel securing structure having a retaining arrangement disposed with respect to the hub axle and a wheel securing shaft member. The retaining arrangement overrideably prevents the shaft member from being axially removed from the hub axle when in a predetermined position within the through bore of the hub axle. In other words, the retaining arrangement is arranged to releasably restrict relative axial movement between the shaft member and the hub axle when the shaft member is disposed in the through bore of the hub axle in a predetermined position so that unintended displacement of the wheel securing shaft structure from the hub axle is prevented during use of the wheel securing shaft structure.

19 Claims, 13 Drawing Sheets

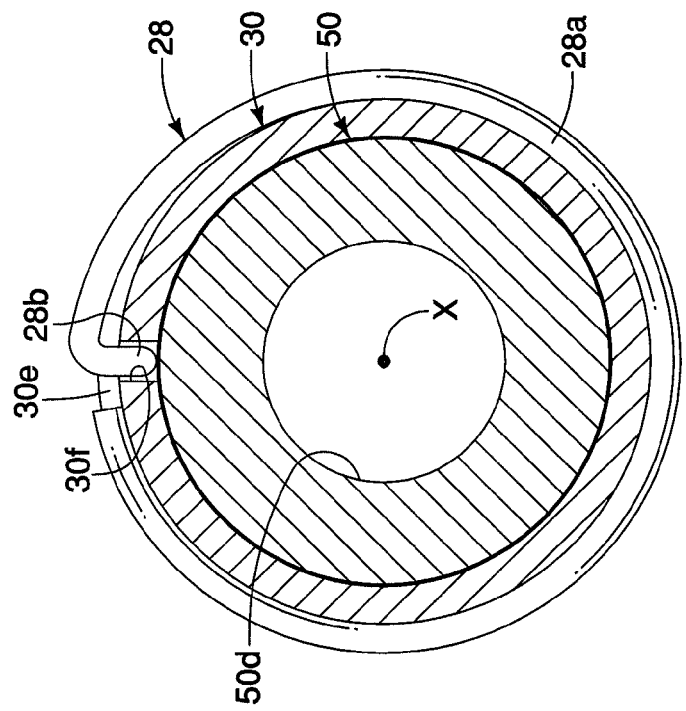
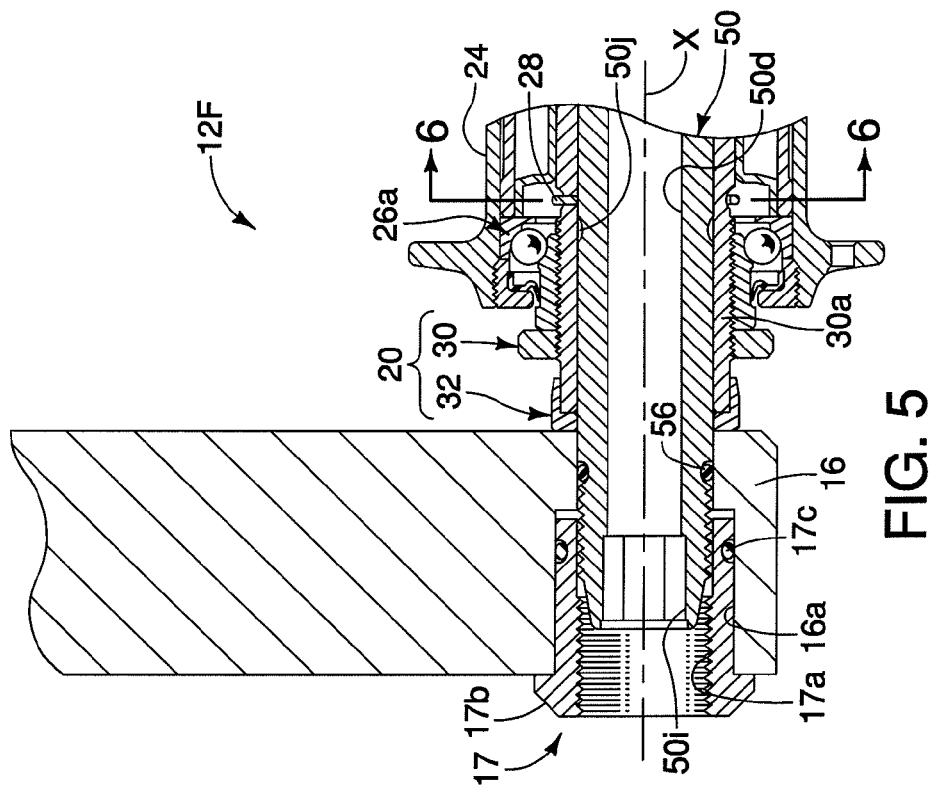

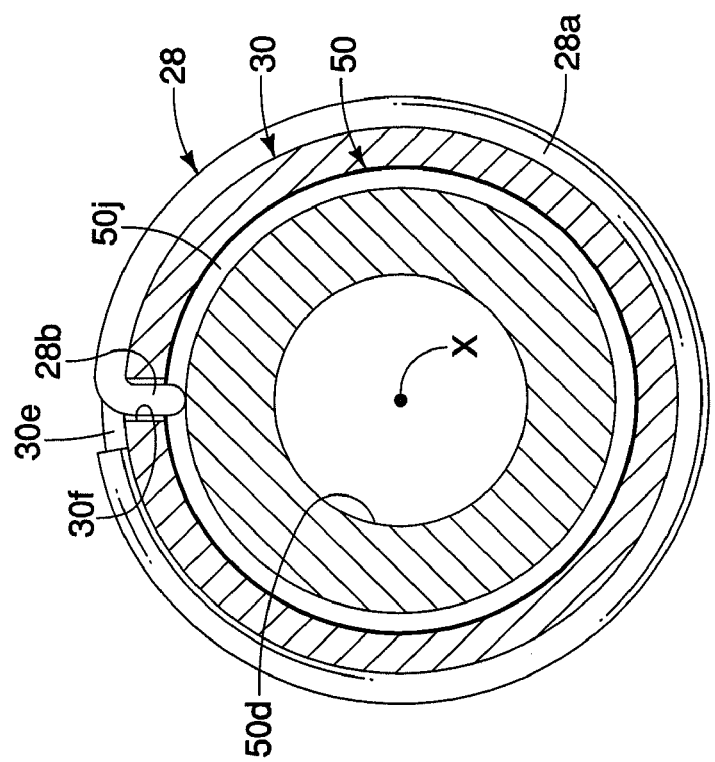
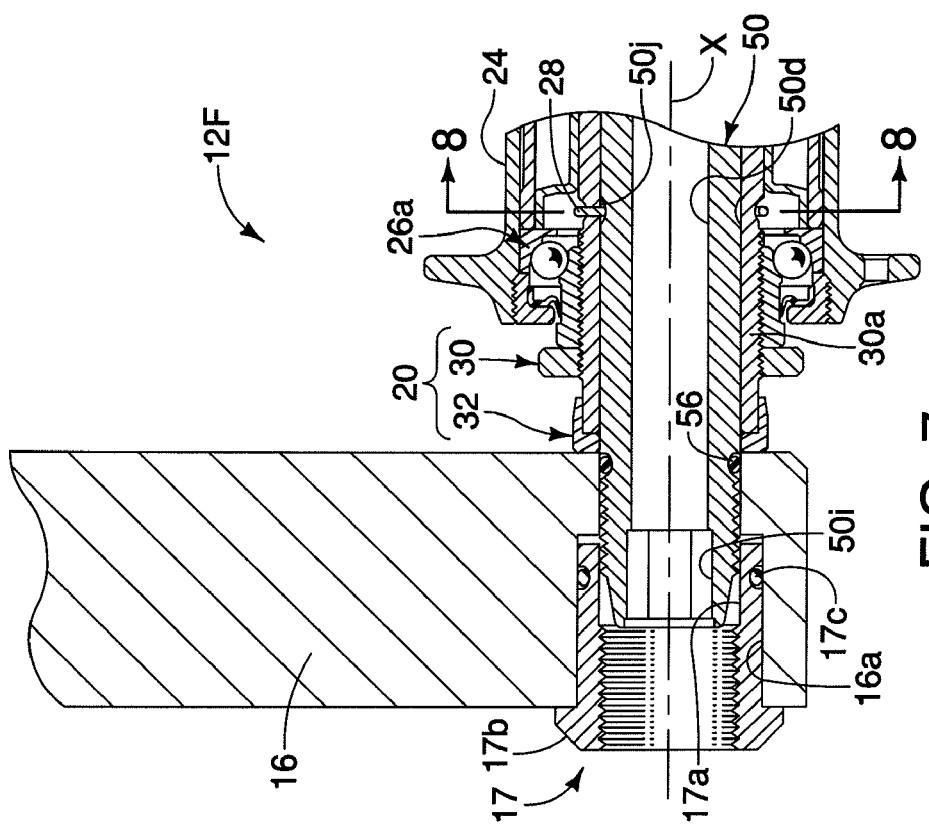

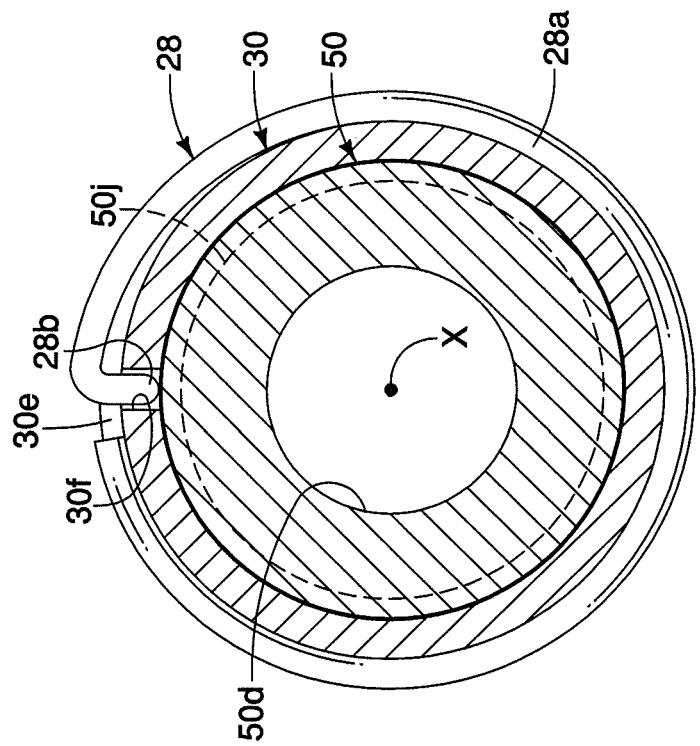
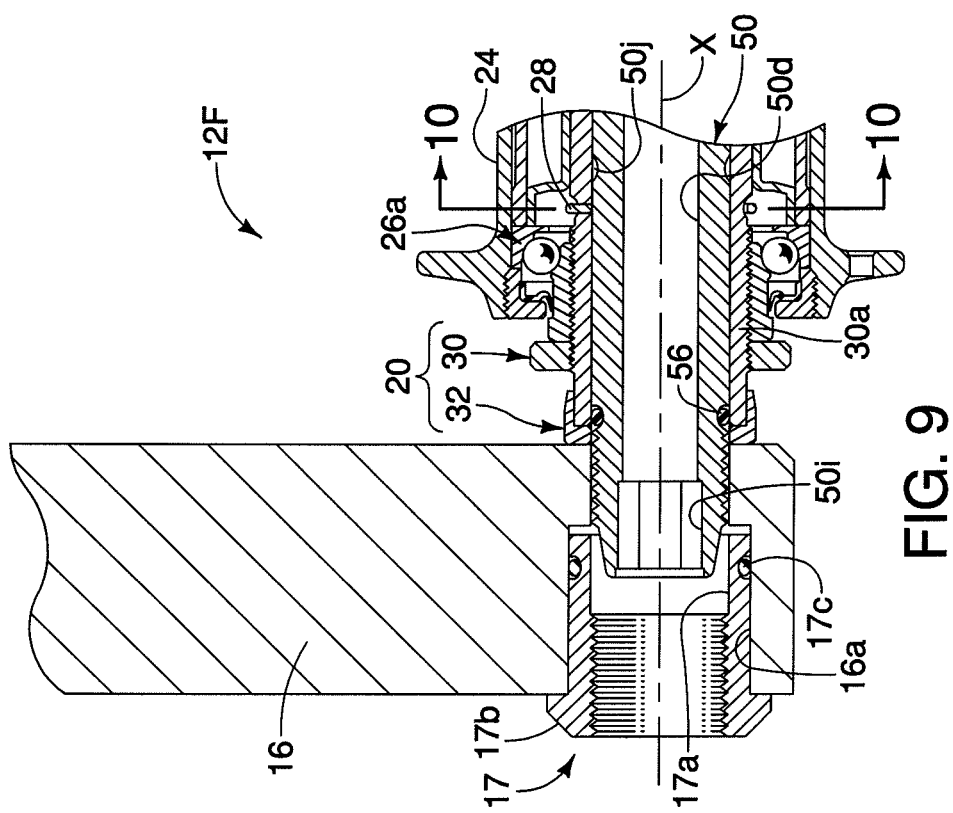
FIG. 10
FIG. 9

BICYCLE WHEEL SECURING STRUCTURE

BACKGROUND OF THE INVENTION

1. Field of the Invention

This invention generally relates to a bicycle wheel securing structure. More specifically, the present invention relates to a bicycle wheel securing structure, which utilizes a retaining arrangement that overrideably prevents unintended displacement of the wheel securing shaft from the hub axle during use.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One component that has been extensively redesigned is the bicycle hub attachment mechanism.

In the past various bicycle parts have been attached using nut and bolt arrangements. However, while certain bicycle parts are designed to be permanently attached to the bicycle, other bicycle parts such as bicycle wheels need to be loosened and removed relatively often. For example, bicycle wheels need to be removed from the frame whenever there is a flat tire. Moreover, bicycle wheels often need to be removed in order to transport a bicycle in an automobile.

Due to the need to remove and reinstall bicycle wheels, bicycle wheel hubs have been provided with wheel securing mechanisms in order to facilitate easier removal and reinstallation of the wheels. A typical wheel securing device includes a skewer with a threaded end having a wheel securing member mounted at the other end. The wheel securing member includes a base with a lever and a cam structure. A nut is detachably threaded onto the threaded end of the skewer after the skewer is inserted through the hub body. The fork flanges of the frame are arranged adjacent the base of the wheel securing member and the hub body and between the nut and the hub body, respectively. Thus, the hub can be attached to the frame by clamping the fork flanges using the wheel securing lever. While these typical wheel securing mechanisms generally work well, a tighter connection between the hub and frame has been in demand for some riders.

Thus, bicycle hubs have been designed with an axle that threadedly attaches directly to the bicycle frame. With this type of hub, a knob is provided on the end of the hub axle opposite the threaded end. The knob is used to rotate the axle during installation to threadedly attach one end of the axle to the frame and to clamp one fork flange between the knob and the hub. With this type of hub, a tighter connection between the hub and the frame is possible as compared to typical wheel securing hubs. However, it can be difficult for some individuals to tighten such a knob. Specifically, with this type of hub, the tightness of the connection between the hub and the frame at least partially depends on the individual installing the hub (i.e., the strength of the individual). Individuals that have difficulty tightening the knob to the desired tightness level may need a tool in order to achieve the desired level of tightness. In any case, while these hubs provide a very tight connection, these types of hubs can be relatively heavier than desired by some riders.

In view of the above, it will be apparent to those skilled in the art from this disclosure that there exists a need for an improved bicycle wheel securing structure. This invention addresses this need in the art as well as other needs, which will become apparent to those skilled in the art from this disclosure.

SUMMARY OF THE INVENTION

One object of the present invention is to provide a bicycle wheel securing structure, which provides a tight connection, yet is relatively easy to tighten and is relatively lightweight.

Another object of the present invention is to provide a bicycle wheel securing structure, which prevents unintended displacement of the wheel securing shaft from the hub axle during use.

Another object of the present invention is to provide a bicycle wheel securing structure, which is relatively simple and inexpensive to manufacture and/or assemble.

The foregoing objects can basically be attained by providing a bicycle wheel securing structure including a hub axle, a shaft member and a retaining arrangement. The hub axle has an axially extending through bore. The shaft member is disposed within the through bore of the hub axle. The shaft member includes a first attachment end, a second attachment end and a center axis extending between the first and second attachment ends. The shaft member has an axial length measured between the first and second attachment ends that is longer than an axial length of the hub axle. The retaining arrangement is disposed with respect to the hub axle and the shaft member, which overrideably prevents the shaft member from being axially removed from the hub axle when in a predetermined position within the through bore of the hub axle.

The foregoing objects can basically be attained by providing a bicycle wheel securing shaft structure arranged and configured to be inserted into a bicycle hub assembly having a hub axle with an axially extending through bore, which includes a shaft member and a retaining arrangement. The shaft member is configured and arranged to be disposed within the through bore of the hub axle. The shaft member includes a first attachment end, a second attachment end and a center axis extending between the first and second attachment ends. The shaft member has an axial length measured between the first and second attachment ends that is longer than an axial length of the hub axle. The retaining arrangement is arranged to releasably restrict relative axial movement between the shaft member and the hub axle when the shaft member is disposed in the through bore of the hub axle in a predetermined position so that unintended displacement of the wheel securing shaft structure from the hub axle is prevented during use of the wheel securing shaft structure.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure:

FIG. 5 is a partial, longitudinal cross-sectional view of the front hub illustrated in FIG. 4, with the wheel securing shaft partially released from the frame and prior to engagement of a retaining arrangement;

FIG. 6 is an enlarged, partial transverse cross-sectional view of the front hub illustrated in FIG. 5, as seen along section line 6-6 of FIG. 5;

FIG. 7 is a longitudinal cross-sectional view of the portion of the front hub illustrated in FIG. 5, with the wheel securing shaft further released from the frame such that the retaining arrangement is engaged;

FIG. 8 is an enlarged, partial transverse cross-sectional view of the front hub illustrated in FIG. 7, as seen along section line 8-8 of FIG. 7;

FIG. 9 is a longitudinal cross-sectional view of the portion of the front hub illustrated in FIG. 7, with the wheel securing shaft further released from the frame such that the retaining arrangement is again disengaged;

FIG. 10 is an enlarged, partial transverse cross-sectional view of the front hub illustrated in FIG. 9, as seen along section line 10-10 of FIG. 9;

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
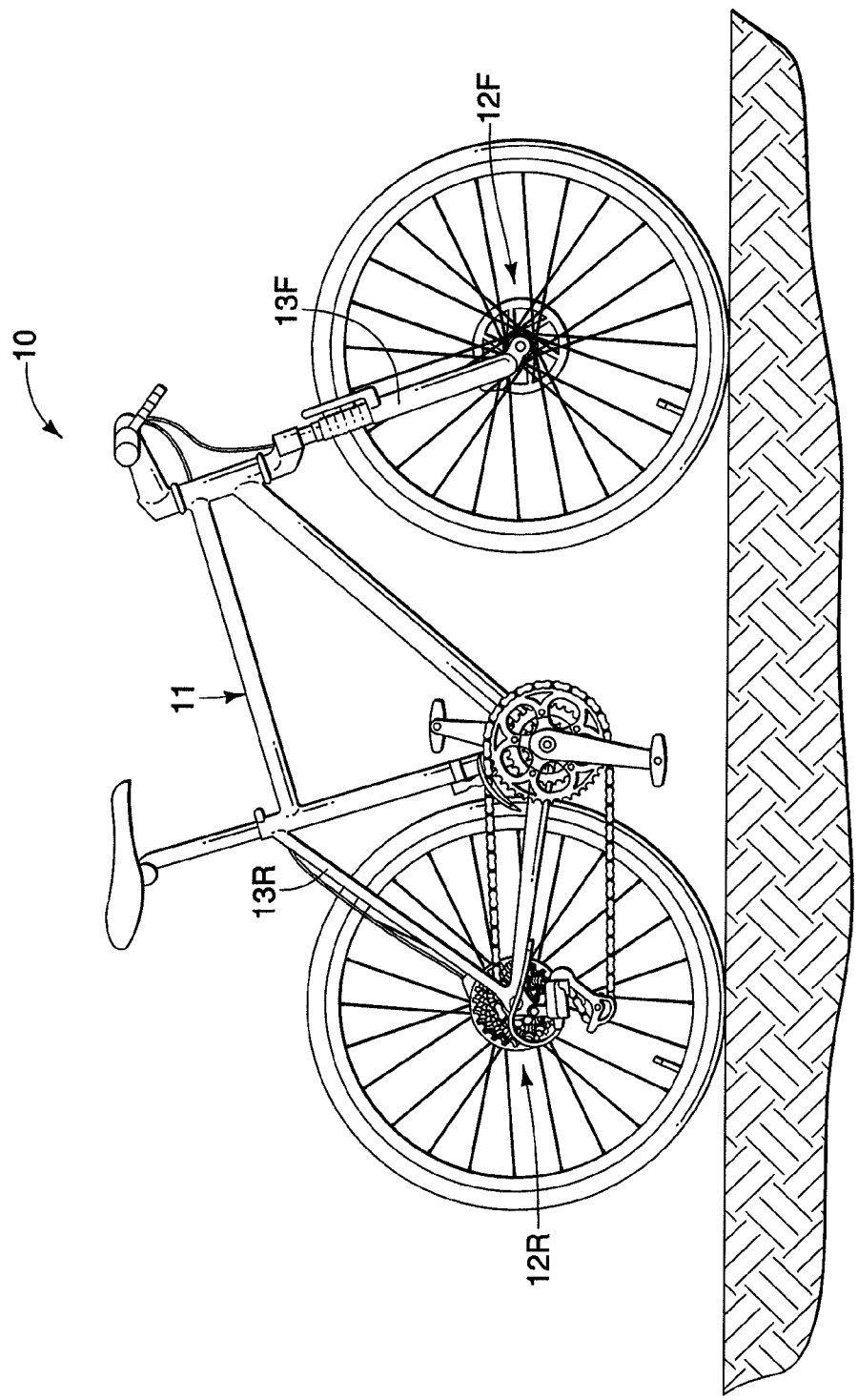
FIG. 1 is a side elevational view of a bicycle with a front bicycle hub coupled thereto in accordance with a first embodiment of the present invention.
Figure 2:
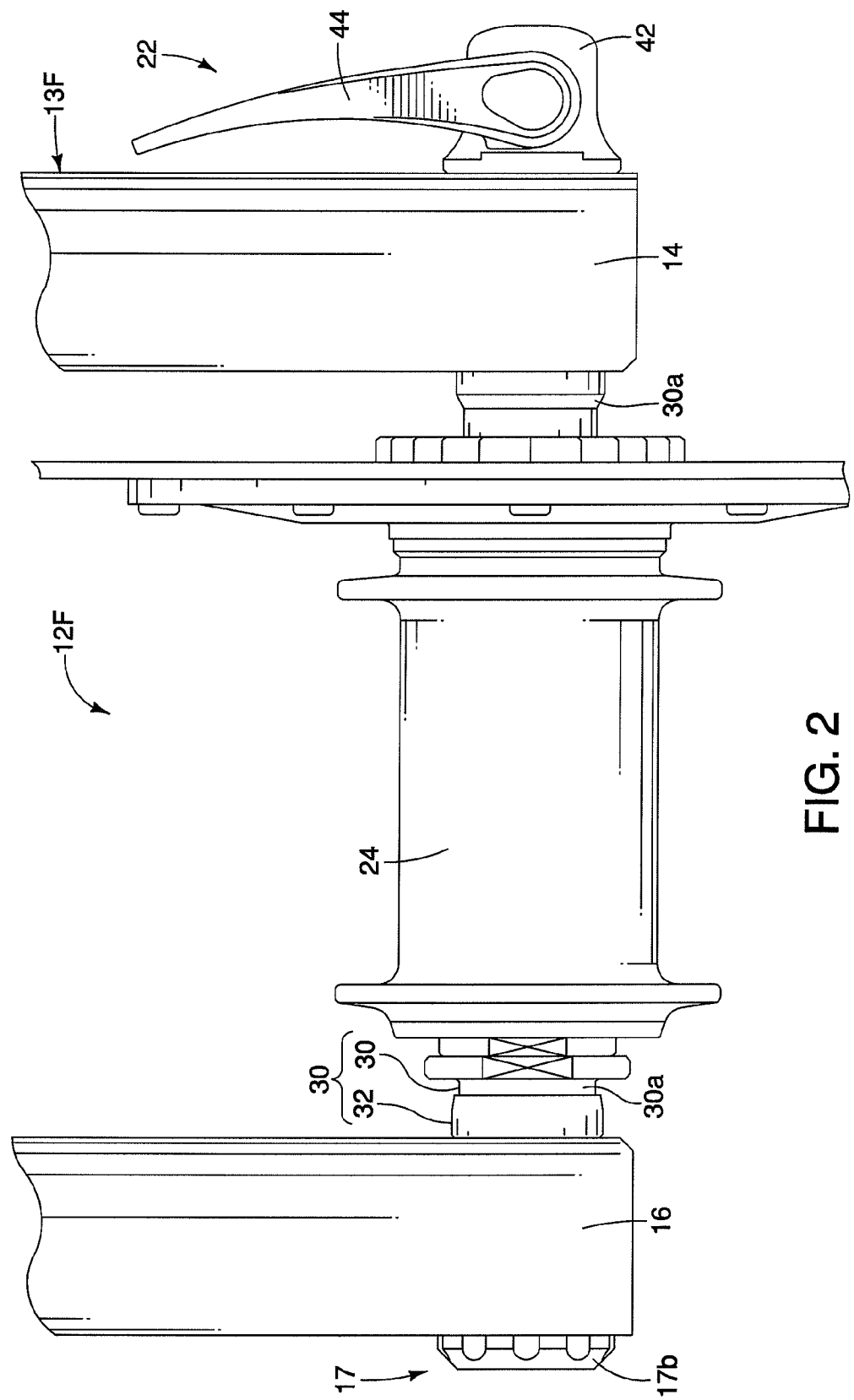
FIG. 2 is an enlarged, longitudinal elevational view of the front hub illustrated in FIG. 1, with the hub fully installed on the front portion of the frame.

Referring initially to FIGS. 1 and 2, a bicycle 10 is illustrated, which has front and rear bicycle hubs 12F and 12R coupled thereto in accordance with the present invention. The front hub 12F is attached a front portion of the frame 11 of the bicycle 10 using a bicycle wheel securing shaft member 22 in accordance with a first embodiment of the present invention. On the other hand, the rear hub 12R is attached to a rear portion of the frame 11 using a wheel securing shaft member that is identical to the wheel securing shaft member 22, except that it is longer to accommodate a free wheel. Specifically, the frame 11 includes front and rear forks fork 13F and 13R for attaching the front and rear bicycle hubs 12F and 12R thereto, respectively. More specifically, the front fork has a pair of front hub mounting flanges 14 and 16 formed at the free ends thereof for attaching the front hub 12F thereto using the bicycle wheel securing shaft member 22. The rear fork 13R has a similar arrangement.

The bicycle 10 is conventional, except for the front and rear bicycle hubs 12F and 12R. Accordingly, the bicycle 10 and its various components will not be discussed and/or illustrated in detail herein, except as related to the front and rear bicycle hubs 12F and 12R of the present invention. Moreover, it will be apparent to those skilled in the bicycle art from this disclosure that various modifications can be made to the bicycle 10 and its components without departing from the present invention.

Figure 3:
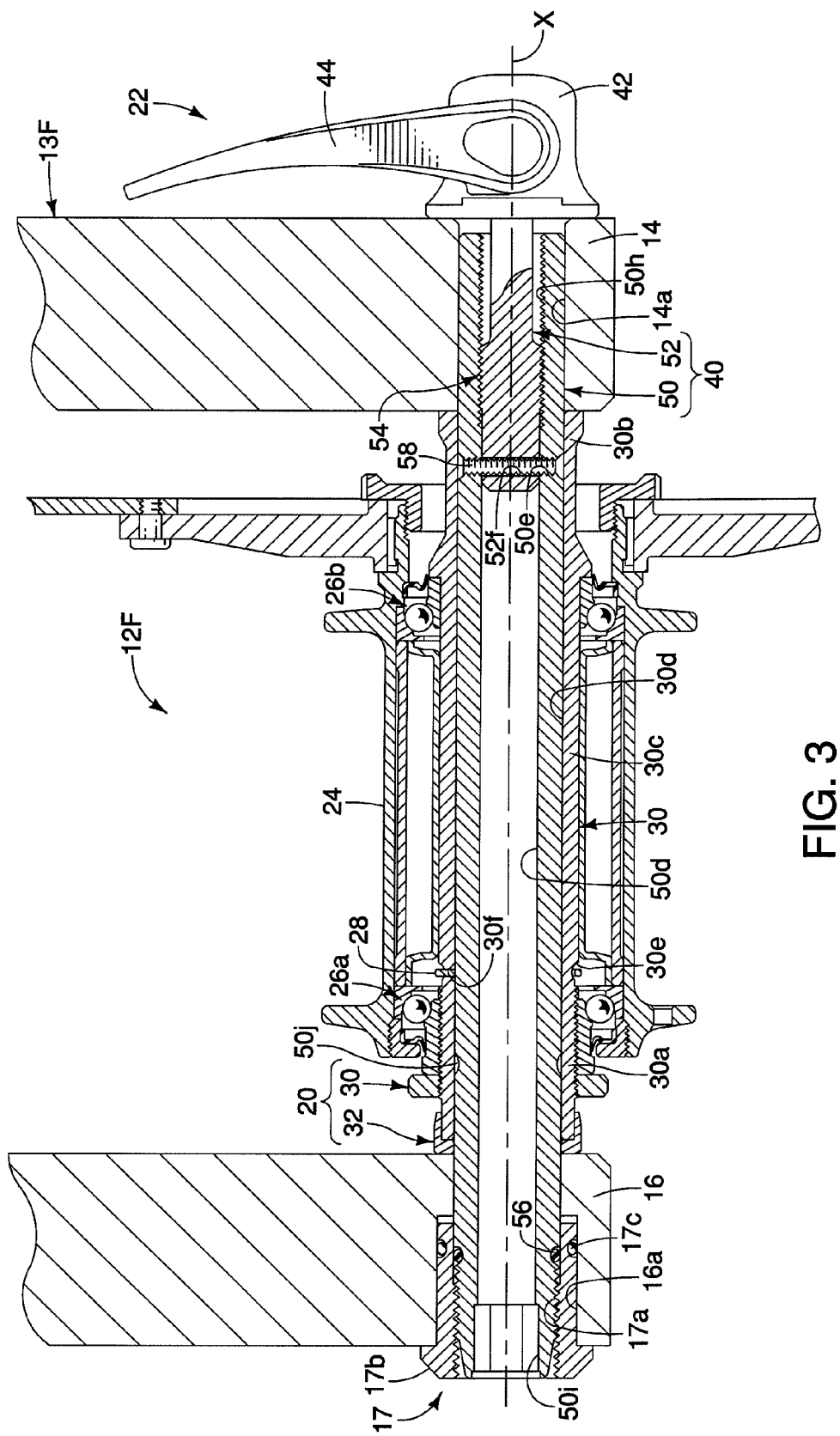
FIG. 3 is a longitudinal cross-sectional view of the front hub and portion of the frame illustrated in FIG. 2.
Figure 4:
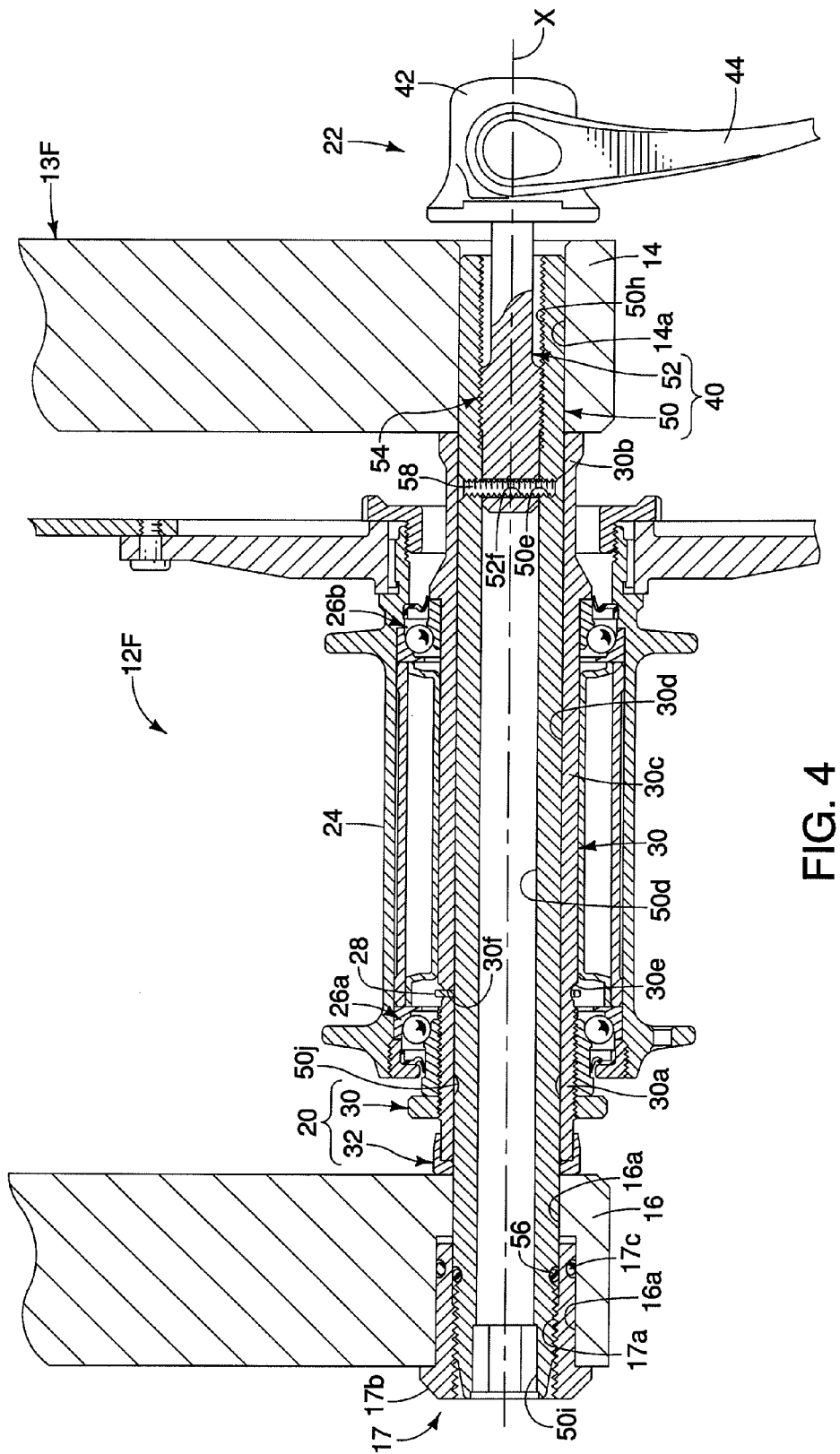
FIG. 4 is a longitudinal cross-sectional view of the front hub illustrated in FIG. 2, with the wheel securing lever in a release position but with the wheel securing shaft still fully installed.

Referring mainly to FIGS. 2-4, the front bicycle hub 12F basically includes a main hub axle 20, the wheel securing shaft member 22, a hub shell 24, a pair of bearing assemblies 26a and 26b, as well as other parts that are not critical to the present invention such as a disc brake rotor structure, seals, nut(s), etc. The main hub axle 20 and the shaft member 22 cooperate with a retaining member 28 that is operatively disposed with respect to the main hub axle 20 and the shaft member 22 to overrideably prevent the shaft member 22 from being axially removed from the main hub axle 20 when in a predetermined position. In other words, the retaining member 28 is arranged to releasably restrict relative axial movement between the shaft member 22 and the main hub axle 20 when the shaft member 22 is in a predetermined position so that unintended displacement of the wheel securing shaft member 22 from the main hub axle 20 is prevented during use. In this embodiment, the retaining member 28 is mounted on the main hub axle 20 to overrideably prevent axial removal of the wheel securing shaft member 22 from the main hub axle 20 once assembled together (i.e., after attachment to the front fork 13F).

The parts of the front hub 12F, other than the main hub axle 20, the shaft member 22 and the retaining member 28, are not critical to the present invention. Moreover, the parts of the front hub 12F, other than the main hub axle 20, the shaft member 22 and the retaining member 28, are preferably relatively conventional. Accordingly, the front hub 12F will not be discussed and/or illustrated in detail herein, except as related to the main hub axle 20, the wheel securing shaft member 22 and the retaining member 28. Basically, the hub shell 24 is rotatably supported on the main hub axle 20 of the front hub 12F via the bearing assemblies 26a and 26b. The wheel securing shaft member 22 extends through the main hub axle 20. The hub shell 24 is coupled to the rear rim via a plurality of spokes to rotate therewith.

Referring to FIGS. 2-11 and 13-15, the main hub axle 20 basically includes a main axle element 30 and an end cap 32. The main axle element 30 basically includes a first end 30a, a second end 30b and a central portion 30c extending axially between the first and second ends 30a and 30b. A through bore 30d extends through the main axle element 30. The end cap 32 is an annular member that is mounted on the first end 30a such that a circular internal bore of constant diameter extends through the main hub axle 20. The end cap 32 axially contacts the mounting flange 16, while the second end 30b axially contacts the mounting flange 14. The overall axial length of both the main axle element 30 and the main hub axle 20 are preferably smaller than an overall axial length of the shaft member 22 so that the shaft member 22 normally projects axially out of the main hub axle 20 when attached to the bicycle 10.

The main axle element 30 further includes an annular external recess 30e with a radially extending through hole 30f extending between the annular recess 30e and the internal through bore 30d. The retaining member 28 is mounted in the annular recess 30e and the through hole 30f. Specifically, the retaining member 28 preferably includes an annular ring section 28a and a retaining section 28b that extends radially inwardly from the ring section 28a. The annular ring section 28a is received in the annular recess 30e, while the retaining section 28b is disposed in the through hole 30f. The ring section 28a and the retaining section 28b are preferably integrally formed together from a lightweight, elastically deformable metallic material using conventional manufacturing techniques. Thus, the retaining member 28 can be considered a spring ring.

The retaining section 28b extends through the through hole 30f such that the retaining section 28b projects radially into the through bore 30d. Thus, the retaining section 28b forms a projection that is normally biased toward an engagement position (FIG. 8) from a non-engagement position (FIGS. 6 and 10) due to the elastic material make-up of the retaining member 28. Thus, the retaining section (projection) 28b is radially movable between the engagement position and the non-engagement position. Accordingly, in this embodiment, a biasing member that is separate from the retaining member 28 is not required. The retaining section 28b will engage the shaft member 22 to overrideably prevent relative axial movement therebetween when the shaft member 22 is in a predetermined axial position relative to the main hub axle 20, as explained below.

Referring to FIGS. 2-14, the bicycle wheel securing shaft member 22 basically includes a shaft element 40, a head member 42 and a lever member 44. The shaft element 40 has one end indirectly threadedly attached to the mounting flange 16, and an opposite end supporting the head member 42. Alternatively, the shaft element 40 may be directly threadedly attached to the mounting flange 16. The lever member 44 is operatively mounted with respect to the shaft element 40 and the head member 42 to move the shaft element 40 in an axial direction relative to the head member 42 in response to movement of the lever member 44 from a release position to a wheel securing position.

The shaft element 40 basically includes an outer shaft 50 and an inner shaft 52 releasably attached within the outer shaft 50 in an installed position, as seen in FIGS. 3, 4, 12 and 16. The outer shaft 50 and the inner shaft 52 are preferably releasably attached together via a threaded connection 54 to releasably prevent axial removal of the inner shaft 52 from the outer shaft 50 when the inner shaft 52 is in the installed position. Alternatively, the inner shaft 52 may be non-releasably attached within the outer shaft 50. The outer and inner shafts 50 and 52 can be selectively prevented from rotating relative to each other so that they move together, as explained below. The shaft element 40 has a longitudinal center axis X extending between opposite ends, as seen in FIGS. 2-5. A direction parallel to the center axis X is an axial/longitudinal direction, while a direction perpendicular to the center axis X is a transverse direction.

Referring to FIGS. 2-4, 6-8 and 10, the outer shaft 50 basically includes a first (tubular) end portion 50a, a second (tubular) end portion 50b, an outer central (tubular) portion 50c, an internal bore 50d and a transverse threaded bore 50e. The internal bore 50d preferably extends axially completely through the outer shaft 50 such that the outer shaft 50 is preferably a tubular member. The internal bore 50d may also be designed to extend axially only partially through the outer shaft 50. The outer central portion 50c is axially disposed between the first and second end portions 50a and 50b. The transverse threaded bore 50e extends between the external surface of the second end portion 50b and the internal bore 50d. The outer shaft 50 preferably has a circular shape as viewed along the longitudinal center axis X.

The first end portion 50a has a threaded end section 50f that is preferably threadedly attached to the mounting flange 16 using an adapter 17 (nut), and an unthreaded section 50g axially disposed between the threaded section 50f and the outer central portion 50c. The threaded end section 50f may also be directly threadedly attached to the mounting flange 16 without using the adapter 17 (i.e., the adapter 17 may be omitted and the through bore 16a may be at least partially threaded, and sized to mate with the threaded end section 50f). The unthreaded section 50g is preferably partially disposed within the mounting flange 16. The second end portion 50b is attached to the mounting flange 14 using the head member 42 and the lever member 44, as explained below. The second end portion 50b is partially received within the mounting flange 14.

The outer shaft 50 is preferably constructed of a lightweight rigid material such as a metallic material utilizing conventional manufacturing techniques such as casting and/or machining. In a preferable embodiment, the outer shaft may constructed of aluminum for weight saving. In this embodiment, the first end portion 50a, the second end portion 50b and the central portion 50c of the outer shaft 50 are preferably constructed as a one-piece, unitary member. An O-ring 56 is preferably mounted in a mating groove of the first end portion 50a between the threaded end section 50f and the unthreaded section 50g. The O-ring 56 is preferably constructed of an elastomeric material such as rubber. The O-ring 56 engages the adapter 17 when fully installed, and engages the mounting flange 16 or the main hub axle 20 when only partially installed. The O-ring 56 is arranged to prevent unintentional rotation of the outer shaft 50, as best understood from FIGS. 3-5 and 7.

The mounting flange 16 has a stepped through bore 16a that is preferably a closed bore with a continuous annular surface (i.e., preferably not a slot), which receives the adapter 17 and the first end portion 50a. In this embodiment, the adapter 17 has partially threaded through bore 17a, an annular flange 17b with a textured tool engagement surface, and an additional O-ring 17c received in an annular groove to engage the stepped through bore 16a to prevent unintentional rotation of the adapter 17. The mounting flange 14 has an unthreaded bore 14a that is preferably a closed bore with a continuous annular surface (i.e., preferably not a slot), which receives the second end portion 50b. However, it will be apparent to those skilled in the bicycle art from this disclosure that outer shaft 50 could be attached to a flange 14 having an open ended slot if needed and/or desired. The outer shaft 50 of the shaft element 40 is preferably dimensioned and tightened to the mounting flange 16 such that the second end portion 50b of the outer shaft 50 adjacent the head member 42 does not project beyond an outer axially facing surface of the mounting flange 14, as seen in FIG. 3.

In this embodiment, the internal bore 50d is a through bore with a threaded section 50h arranged at the second end portion 50b of the outer shaft 50 and a hexagonal bore 50i arranged at the first end portion 50a. The internal bore 50d is slightly stepped in order to receive the inner shaft 52 therein, as best understood from FIGS. 3-4. The inner shaft 52 is threadedly attached to the threaded section 50h of the internal bore 50d. The inner shaft 52 extends out of the internal bore 50d at the second end portion 50b. Thus, the inner shaft 52 extends from the second end portion 50b of the outer shaft 50 when the inner shaft 52 is in the installed position. The head member 42 is preferably attached to an end of the inner shaft 52 extending out of the internal bore 50d, as explained below. The internal bore 50d preferably has a circular internal shape, as viewed along the center axis X.

As seen in FIGS. 2-10 and 16, the outer shaft 50 has an annular recess 50j arranged to engage the retaining section 28b of the retaining member 28 in a predetermined position (shown in FIGS. 7-8). In this predetermined position, the retaining section 28b engages the annular recess 50j to overrideably prevent the shaft member 22 from being axially removed from the main hub axle 20. In other words, the retaining member 28 is arranged to releasably restrict relative axial movement between the shaft member 22 and the main hub axle 22 when the shaft member 22 is disposed in the through bore 30d of the hub axle 20 in a predetermined position so that unintended displacement of the shaft member 22 from the main hub axle 20 is prevented. Thus, in this embodiment, the recess 50j and the retaining section (projection) 28b are sized to prevent free relative axial movement between the outer shaft 50 and the main hub axle 20 when engaged with each other in the predetermined position illustrated in FIGS. 7-8. The recess 50j preferably has a flat (trough) section with an axial width corresponding to an axial width of the retaining section 28b, and a pair of sloped or curved sections extending from the trough section.

In this embodiment, the annular recess 30e and the through hole 30f of the axle element 30, the retaining member 28 (i.e., the ring section 28a and the retaining section 28b), and the annular recess 50j of the outer shaft 50 of the shaft member 22 constitute parts of a retaining arrangement in accordance with the present invention. Moreover, shaft member 22 and the retaining member 28 constitute parts of a bicycle wheel securing shaft structure in accordance with the present invention. In either case, a retaining arrangement is provided to overrideably prevent the shaft member 22 from being axially removed from the main hub axle 20, as mentioned above.

A set screw 58 is preferably threadedly mounted in the transverse threaded bore 50e to releasably prevent both relative rotation and relative axial movement of the inner shaft 52 within the internal bore 50d when the inner shaft 52 is in the installed position, as explained below. In the illustrated embodiment, the set screw 58 extends through the inner shaft 52, as best understood from FIGS. 3, 4, 12 and 16. However, alternatively, the set screw 58 can be arranged to selectively contact an external surface of the inner shaft 52 when tightened. Due to the above arrangement of the set screw, the set screw 58 prevents rotation of the inner shaft 52 relative to the outer shaft 50. Thus, the set screw 58 is preferably disposed between the outer shaft 50 and the inner shaft 52 to releasably prevent relative rotation of the inner shaft 52 within the internal bore 50d when the inner shaft 52 is in the installed position. The transverse threaded bore 50e includes two sections extending between an external surface of the outer shaft 50 and the internal bore 50d.

Figure 12:
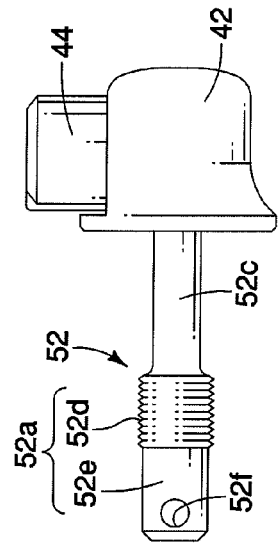
FIG. 12 is a longitudinal elevational view of the inner shaft of the wheel securing shaft of the front hub illustrated in FIGS. 2-4.
Figure 14:
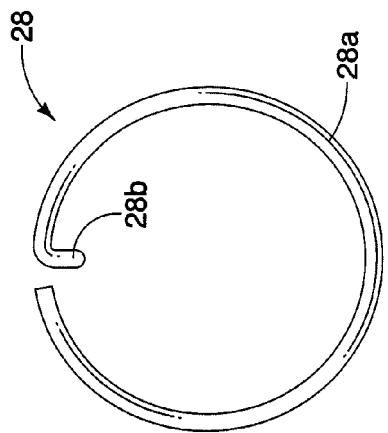
FIG. 14 is an end elevational view of the retaining member illustrated in FIG. 13.
Figure 11:
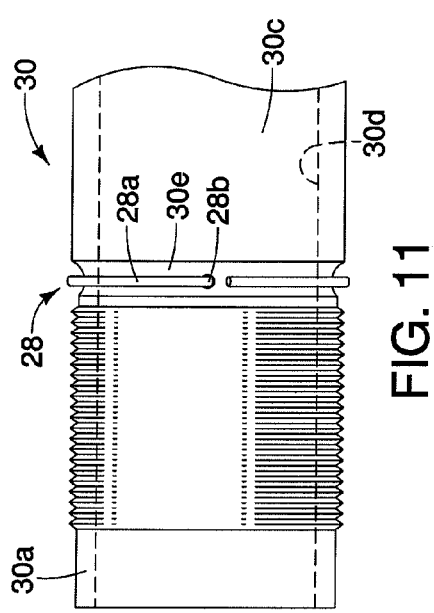
FIG. 11 is an enlarged, partial longitudinal elevational view of the hub axle of the front hub illustrated in FIGS. 3-4, with a retaining member of the retaining arrangement mounted thereon.
Figure 13:
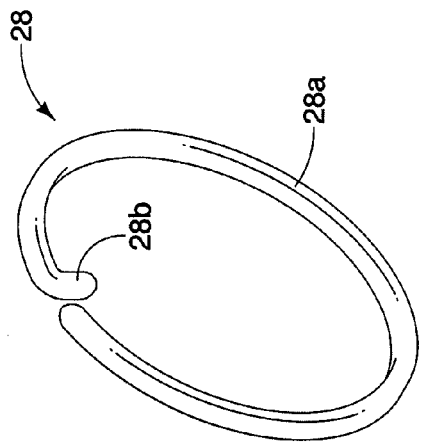
FIG. 13 is an enlarged perspective view of the retaining member illustrated in FIG. 11.
Figure 15:
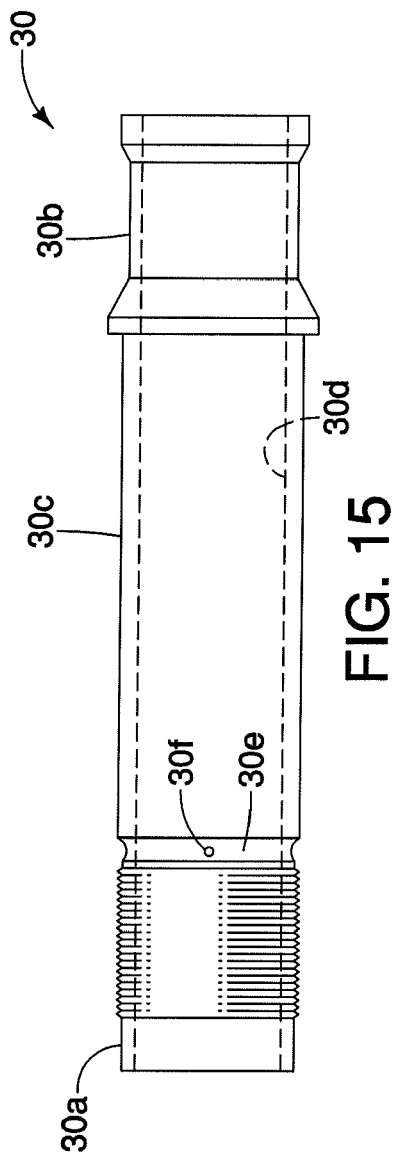
FIG. 15 is longitudinal elevational view of the hub axle of the front hub illustrated in FIGS. 3-4, with a retaining member of the retaining arrangement removed for the purpose of illustration.
Figure 16:
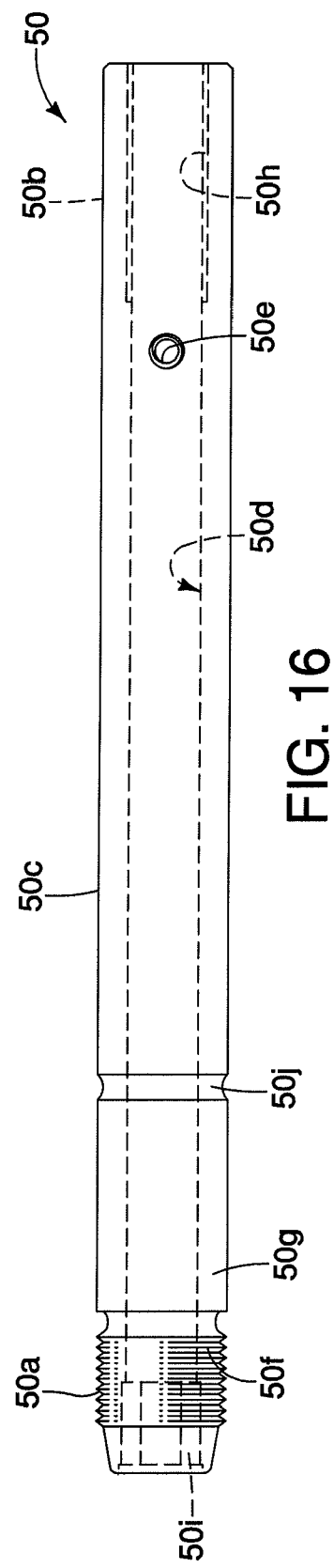
FIG. 16 a longitudinal elevational view of the outer shaft of the wheel securing shaft of the front hub illustrated in FIGS. 2-4.

Referring to FIGS. 3, 4 and 12, the inner shaft 52 basically includes an inner first end portion 52a, an inner second end portion (not shown) and an inner central portion 52c. The first end portion 52a includes a threaded section 52d and a free end section 52e extending axially from the threaded section 52d so as to be aligned with the transverse threaded bore 50e when the inner shaft 52 is installed in the outer shaft 50. In this embodiment, the free end section 52e of the inner shaft 52 includes a smooth outer surface with at least one through bore 52f extending therethrough in order to releasably receive the set screw 58 therethrough. The through bore 52f can be circular in shape as illustrated herein or can be elongated in the longitudinal direction to form a slot. The threaded section 52d is threadedly attached to the threaded section 50h of the internal bore 50d. The threaded section 52d and the threaded section 50h constitute parts of the threaded connection 54 when coupled together.

The inner central portion 52c is partially received in the threaded section 50h of the through bore 50d such that the inner central portion 52c extends out of the internal bore 50d and supports the head member 42 and the lever member 44. Specifically, the second end portion (not shown) of the inner shaft 52 has a bracket (not shown) attached thereto or integrally formed therewith, which supports the head member 42 and the lever member 44 with a cam structure (not shown) disposed therebetween in a conventional manner. Thus, the bracket (not shown) of the inner shaft 52 cooperates with the head member 42, the lever member 44 and cam mechanism (not shown) to move the inner shaft 52, and thus, the shaft element 40 axially relative to the head member 42 in response to rotation of the lever member 44 in a conventional manner.

The central portion 52c is axially disposed between the threaded section 52d and the second end portion (not shown) of the inner shaft 52 disposed within the head member 42. The inner shaft 52 preferably has a circular shape as viewed along the center axis X, as best understood from FIGS. 3, 4 and 12. The inner shaft 52 is preferably constructed of a rigid material such as a metallic material utilizing conventional manufacturing techniques such as casting and/or machining. More preferably, the inner shaft 52 is constructed of a metallic material having an appropriate elasticity as well as rigidity, such as an iron based metallic material (e.g. an iron based alloy such as chrome-moly steel), so as to provide a user with appropriate operational feeling when the lever member 44 is operated. In this embodiment, the first end portion 52a, the second end portion (not shown) and the central portion 52c are preferably integrally formed together as a one-piece, unitary member.

In this embodiment, the first end portion 50a of the outer shaft 50 constitutes a first attachment end of the shaft member 22. In this embodiment, the second end portion 50b of the outer shaft 50, the inner shaft 52, the head member 42 and the lever member 44 constitute parts of a second attachment end of the shaft member 22. The term "axially overrideably" as used herein means an application of a primarily axially force for releasing a connection (e.g. for overcoming an axial retaining force applied by the retaining arrangement). In other words, the retaining section 28b will normally apply an axial retaining force to the shaft member 22 when received in the recess 50j. However, upon applying an axial force on the shaft member 22 larger than the retaining force, the retaining section 28b will move radially outwardly against the biasing force of the retaining member 28 to release the shaft member from the predetermined position. Thus, the shaft member 22 can be retained with the other parts of the front hub 12F, except when removal is desired.

It will be apparent to those skilled in the bicycle art from this disclosure that the axial location(s) of the parts of the arrangement can be modified if needed and/or desired. In other words, it will be apparent to those skilled in the bicycle art from this disclosure that the "predetermined position" described herein can be moved if needed and/or desired. In any event, the predetermined position should preferably be located so that the retaining arrangement can prevent undesired removal of the shaft member 22 from the front hub 12F.

Second Embodiment

Figure 17:
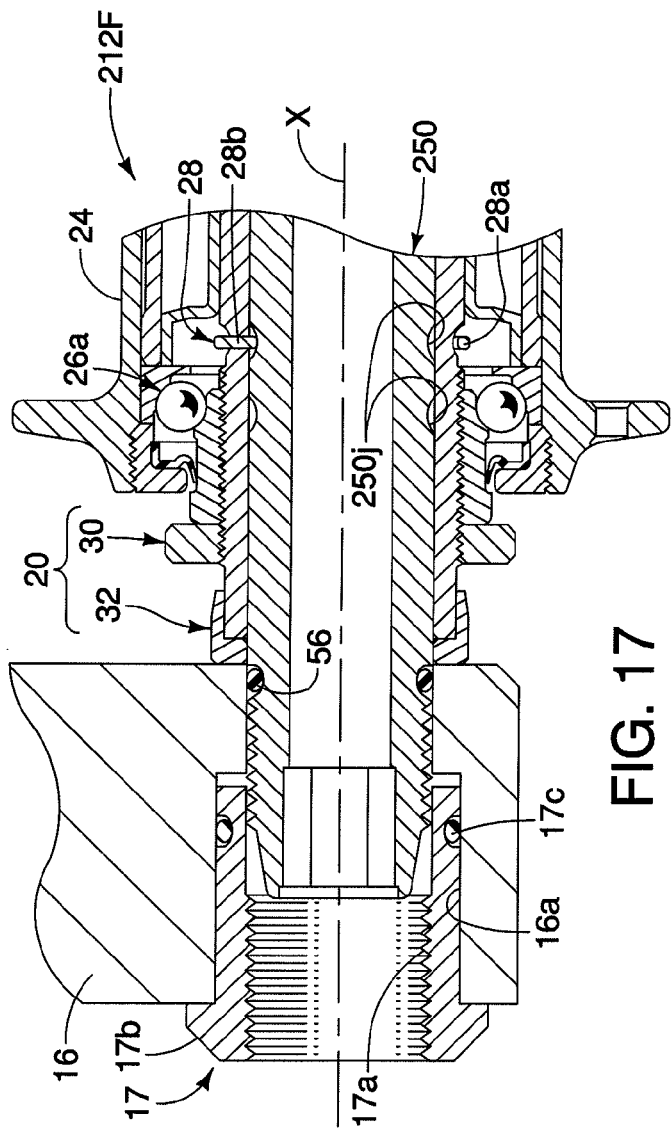
FIG. 17 is an enlarged, partial cross-sectional view of a front hub having a retaining arrangement in accordance with a second embodiment of the present invention.
Figure 18:
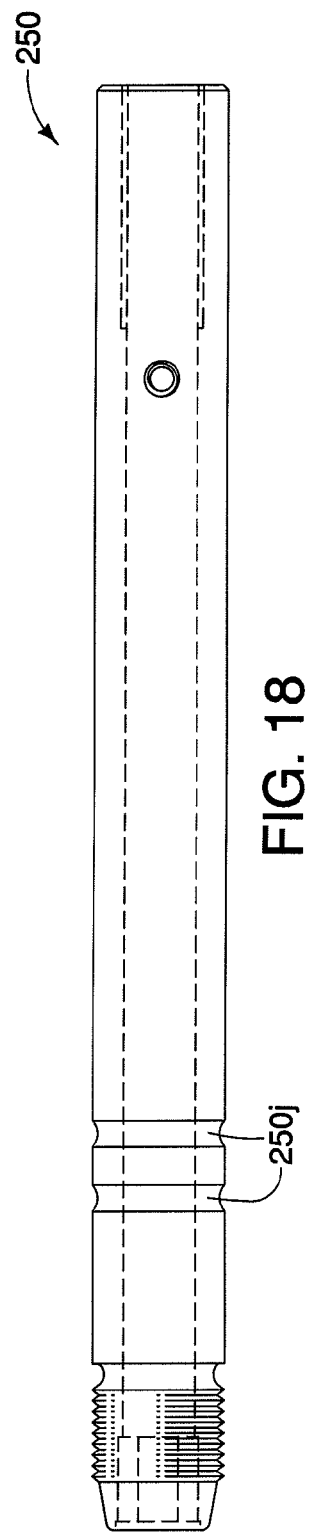
FIG. 18 is a longitudinal elevational view of the outer shaft of the wheel securing shaft of the front hub illustrated in FIG. 17.

Referring now to FIGS. 17-18, portions of a modified front hub 212F having a modified outer shaft 250 in accordance with a second embodiment of the present invention will now be explained. This front hub 212F is identical to the front hub 12F of the first embodiment, except for the modified outer shaft 250. Accordingly, this second embodiment will not be discussed and/or illustrated in detail herein, except as related to the outer shaft 250. However, it will be apparent to those skilled in the bicycle art from this disclosure that the descriptions and illustrations of the first embodiment also apply to this second embodiment, except as explained and/or illustrated herein. Moreover, it will be apparent to those skilled in the bicycle art from this disclosure that the principles of this second embodiment can be applied to a rear hub if needed and/or desired.

Parts of this second embodiment that are identical to parts of the first embodiment will be identified with same reference characters as the first embodiment for the sake of convenience. Parts of this second embodiment that are functionally identical (but not exactly identical) to parts of the first embodiment will be identified with the same reference characters but with "200" added thereto for the sake of convenience.

The modified outer shaft 250 is identical to the outer shaft 50 of the first embodiment, except the outer shaft 250 includes a plurality (e.g., two) axially spaced annular recesses 250j designed to selectively engage the retaining member 28 in a plurality (e.g. two) of axially spaced predetermined positions. Each of the recesses 250j and the retaining section (projection) 28b are sized to prevent free relative axial movement between the outer shaft 250 and the main hub axle 20 when engaged with each other in each of the predetermined positions in a manner identical to the first embodiment.

Third Embodiment

Figure 19:
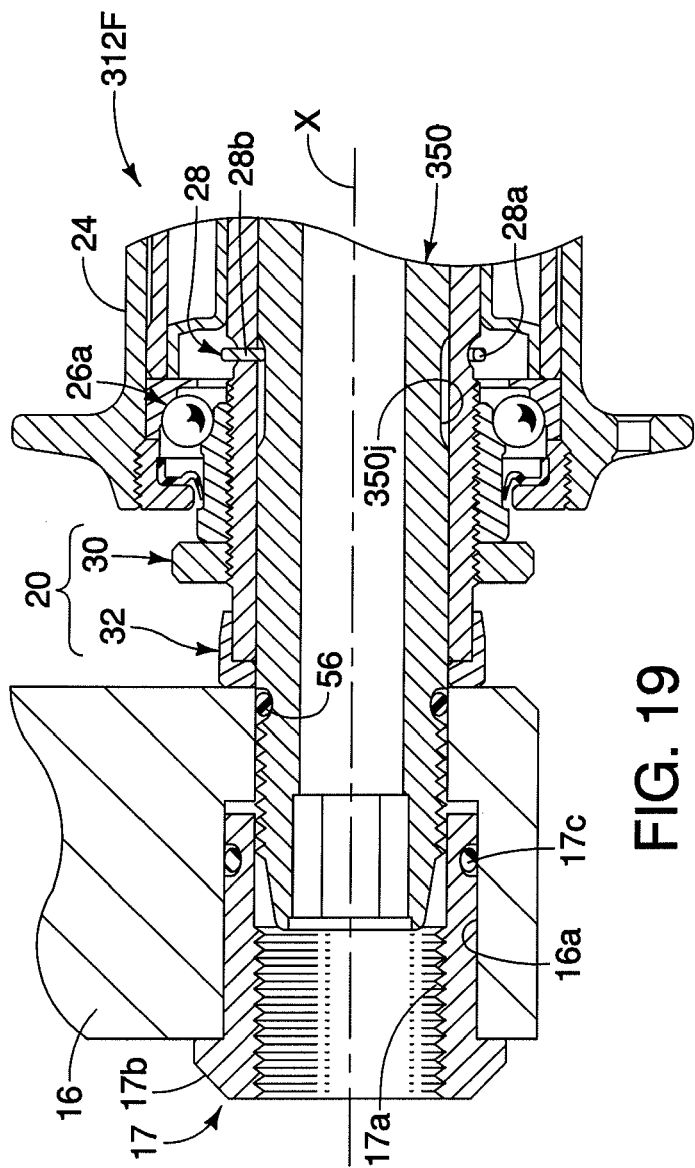
FIG. 19 is an enlarged, partial cross-sectional view of a front hub having a retaining arrangement in accordance with a third embodiment of the present invention.
Figure 20:
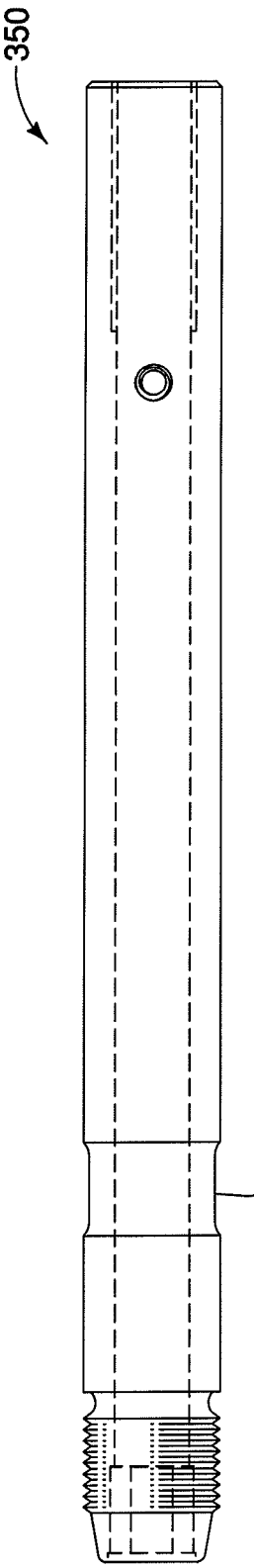
FIG. 20 is a longitudinal elevational view of the outer shaft of the wheel securing shaft of the front hub illustrated in FIG. 19.
Figure 21:
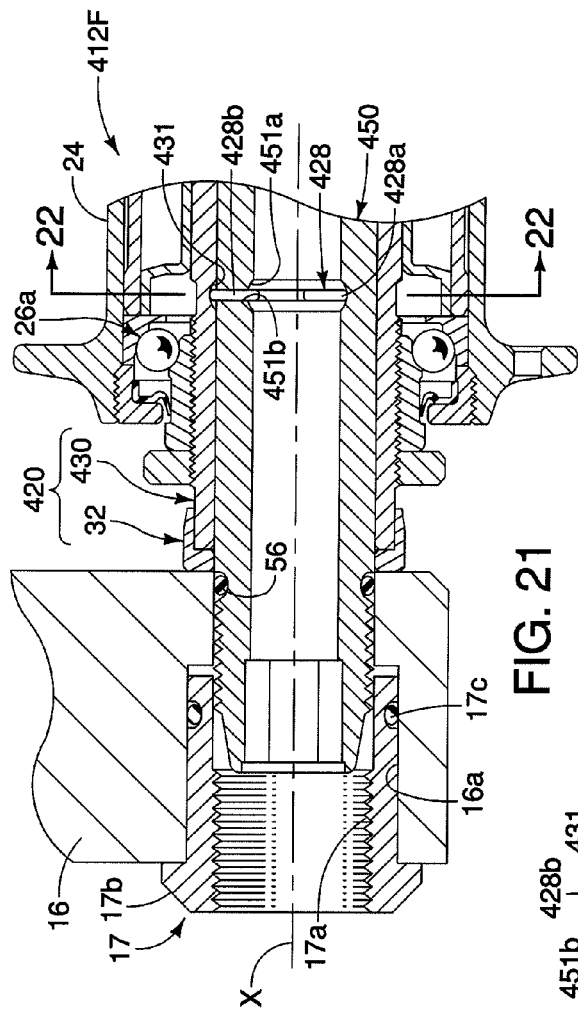
FIG. 21 is an enlarged, partial cross-sectional view of a front hub having a retaining arrangement in accordance with a fourth embodiment of the present invention.
Figure 22:
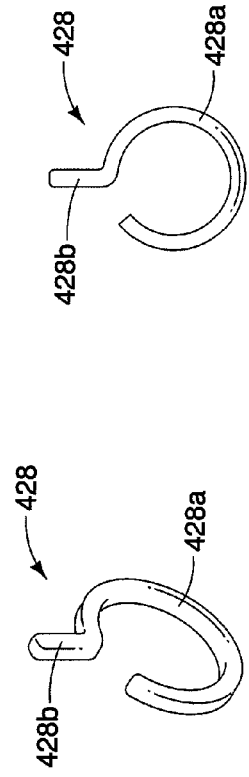
FIG. 22 is an enlarged, transverse, partial cross-sectional view of the front hub illustrated in FIG. 21, as seen along section line 22-22 of FIG. 21.
Figure 23:
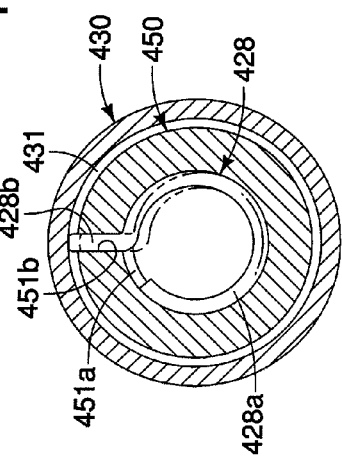
FIG. 23 is a perspective view of the retaining member of the retaining arrangement illustrated in FIGS. 21 and 22.
Figure 24:
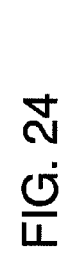
FIG. 24 is an end elevational view of the retaining member illustrated in FIG. 23.

Referring now to FIGS. 19-20, portions of a modified front hub 312F having a modified outer shaft 350 in accordance with a third embodiment of the present invention will now be explained. This front hub 312F is identical to the front hub 12F of the first embodiment, except for the modified outer shaft 350. Accordingly, this third embodiment will not be discussed and/or illustrated in detail herein, except as related to the outer shaft 350. However, it will be apparent to those skilled in the bicycle art from this disclosure that the descriptions and illustrations of the first embodiment also apply to this third embodiment, except as explained and/or illustrated herein. Moreover, it will be apparent to those skilled in the bicycle art from this disclosure that the principles of this third embodiment can be applied to a rear hub if needed and/or desired.

Parts of this third embodiment that are identical to parts of the first embodiment will be identified with same reference characters as the first embodiment for the sake of convenience. Parts of this third embodiment that are functionally identical (but not exactly identical) to parts of the first embodiment will be identified with the same reference characters but with "300" added thereto for the sake of convenience.

The modified outer shaft 350 is identical to the outer shaft 50 of the first embodiment, except the outer shaft 350 includes an axially wider annular recess 350j designed to engage the retaining member 28 along a range of predetermined positions. The recess 350j and the retaining section (projection) 28b are sized to allow a predetermined range of free relative axial movement between the outer shaft 350 and the main hub axle 20 when engaged with each along a range of the predetermined positions, but to prevent relative axial movement at the end positions in a manner identical to the first embodiment.

Fourth Embodiment

Referring now to FIGS. 21-24, portions of a modified front hub 412F in accordance with a fourth embodiment of the present invention will now be explained. This front hub 412F is identical to the front hub 12F of the first embodiment, except the front hub 412F includes a modified retaining member 428, a modified main hub axle 420 with a modified axle element 430, and a modified outer shaft 450. Basically, the corresponding parts of the first embodiment have been modified in this fourth embodiment such that the retaining member 428 is mounted within the outer shaft 450 to engage the main hub axle 420. Accordingly, this fourth embodiment will not be discussed and/or illustrated in detail herein, except as related to the retaining member 428, the main hub axle 420 and the outer shaft 450. However, it will be apparent to those skilled in the bicycle art from this disclosure that the descriptions and illustrations of the first embodiment also apply to this fourth embodiment, except as explained and/or illustrated herein. Moreover, it will be apparent to those skilled in the bicycle art from this disclosure that the principles of this fourth embodiment can be applied to a rear hub, and/or applied to the second and/or third embodiments, if needed and/or desired.

Parts of this fourth embodiment that are identical to parts of the first embodiment will be identified with same reference characters as the first embodiment for the sake of convenience. Parts of this fourth embodiment that are functionally identical (but not exactly identical) to parts of the first embodiment will be identified with the same reference characters but with "400" added thereto for the sake of convenience.

The modified retaining member 428 includes a ring section 428a and a retaining section 428b extending radially outwardly from the ring section 428a. The ring section 428a has a smaller diameter than the ring section 28a so as to be received within the outer shaft 450. The outer shaft 450 includes an annular internal recess 451a with a radial through hole 451b extending therefrom to receive the ring section 428a and the retaining section 428b, respectively. The recess 50j of the first embodiment has been eliminated. The axle element 430 of the main hub axle 420 has an annular internal recess 431 arranged to engage the retaining section (projection) 428b in a predetermined position. The recess 431 and the retaining section (projection) 428b are sized to prevent free relative axial movement between the outer shaft 450 and the main hub axle 420 when engaged with each other in each of the predetermined position. Because the radial through hole 451b is provided in the outer shaft 450 (i.e., not the axle element 430) in this embodiment, intrusion of contamination such as water, mud and the like into the inside of the assembled front hub 412F is effectively prevented.

Fifth Embodiment

Figure 25:
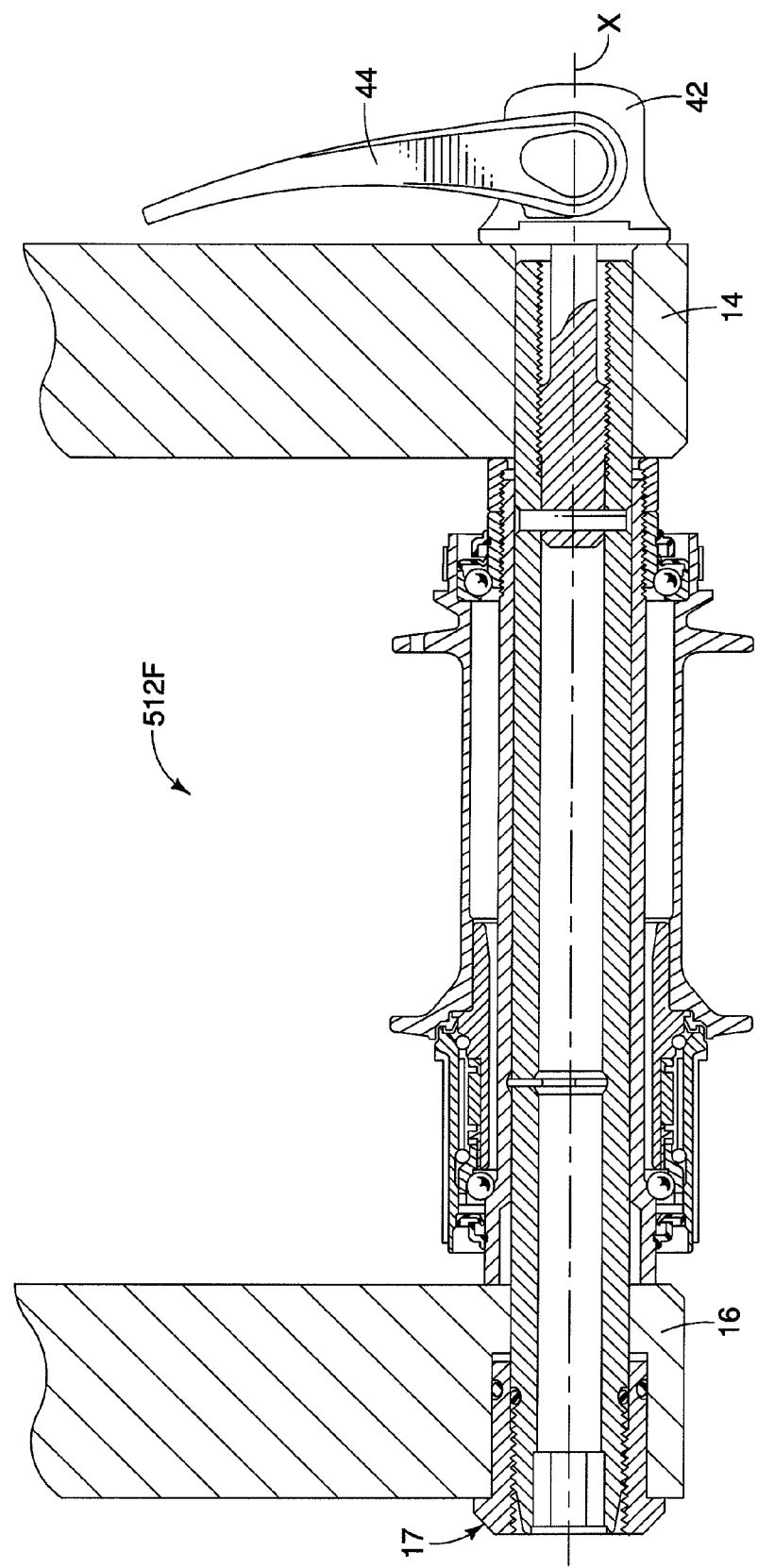
FIG. 25 is a longitudinal cross-sectional view of a rear hub utilizing a retaining arrangement in accordance with a fifth embodiment of the present invention.

Referring now to FIG. 25, a modified rear hub 512R having a modified retaining arrangement in accordance with a fifth embodiment of the present invention will now be explained. This rear hub 512R is identical to the rear hub 12R of the first embodiment, except for the retaining arrangement. Specifically, this rear hub 512R is identical to the front hub 12F except certain parts have been modified slightly to accommodate a free wheel FW (i.e., because rear hubs are axially larger than front hubs and include a free wheel and one-way clutch), and this rear hub 512R uses the retaining arrangement of the fourth embodiment. However, in this fifth embodiment, the predetermined position has been moved to correspond to a fully installed position of the rear hub 512R. It will be apparent to those skilled in the bicycle art from this disclosure that the "predetermined position" in this fifth embodiment can be a partially installed position like the preceding embodiment. Moreover, it will be apparent to those skilled in the bicycle art from this disclosure that the "predetermined positions" of the preceding embodiments can be modified to correspond to a fully installed position like this fifth embodiment.

In view of the similarities between this fifth embodiment, first embodiment and fourth embodiment, this fifth embodiment will not be discussed and/or illustrated in detail herein. However, it will be apparent to those skilled in the bicycle art from this disclosure that the descriptions and illustrations of the first and fourth embodiments also apply to this fifth embodiment, except as explained and/or illustrated herein. Moreover, it will be apparent to those skilled in the bicycle art from this disclosure that the principles of this fifth embodiment can be applied to a rear hub if needed and/or desired.

Parts of this fifth embodiment that are identical to parts of the first embodiment will be identified with same reference characters as the first embodiment for the sake of convenience. Parts of this fifth embodiment that are functionally identical (but not exactly identical) to parts of the first embodiment will be identified with the same reference characters but with "500" added thereto for the sake of convenience. In the rear hub 512R, the inner bear race of one of the cup/cone bearing assemblies is integrally formed with the main axle element as a one-piece unit.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section", "portion," "member" or "element" when used in the singular can have the dual meaning of a single part or a plurality of parts. As used herein to describe the present invention, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention as used in the normal riding position. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle wheel securing structure comprising:
    a hub axle having an axially extending through bore;
    a shaft member disposed within the through bore of the hub axle, the shaft member including a first attachment end, a second attachment end and a center axis extending between the first and second attachment ends, the shaft member having an axial length measured between the first and second attachment ends that is longer than an axial length of the hub axle; and
    a retaining arrangement disposed with respect to the hub axle and the shaft member, which axially overrideably prevents the shaft member from being axially removed from the hub axle when in a predetermined position within the through bore of the hub axle, the retaining arrangement being movably mounted to move from an engagement position to a non-engagement position in response to relative movement of the shaft member with respect to the hub axle, with the retaining arrangement being biased toward the engagement position from the non-engagement position.

2. The bicycle wheel securing structure according to claim 1, wherein
    the first and second attachment ends project axially from the hub axle when the shaft member is in a predetermined position.

3. The bicycle wheel securing structure according to claim 1, wherein
    the retaining arrangement includes a projection coupled to one of the hub axle and the shaft member and a recess formed in the other of the hub axle and the shaft member, the projection engaging the recess in the predetermined position.

4. The bicycle wheel securing structure according to claim 3, wherein
    the projection is radially movable between a non-engagement position when the shaft member is not in the predetermined position and an engagement position when the shaft member is in the predetermined position.

5. The bicycle wheel securing structure according to claim 4, wherein
    the projection is normally biased toward the engagement position from the non-engagement position.

6. The bicycle wheel securing structure according to claim 3, wherein
    the recess is formed in the hub axle and the projection is coupled to the shaft member.

7. The bicycle wheel securing structure according to claim 3, wherein
the recess is formed in the shaft member and the projection is coupled to the hub axle.

8. The bicycle wheel securing structure according to claim 3, wherein
the recess and the projection are sized to prevent free relative axial movement between the shaft member and the hub axle when engaged with each other in the predetermined position.

9. The bicycle wheel securing structure according to claim 8, wherein
the shaft member includes a fixing structure disposed between an outer shaft and an inner shaft to releasably prevent relative rotation of the inner shaft within an internal bore.

10. The bicycle wheel securing structure according to claim 3, wherein
the recess and the projection are sized to allow a predetermined range of free relative axial movement between the shaft member and the hub axle when engaged with each other in the predetermined position.

11. The bicycle wheel securing structure according to claim 3, wherein
the one of the hub axle and the shaft member having the recess includes a plurality of axially spaced recesses, the projection being selectively engageable with one of the recesses in the predetermined position and another one of the recesses in a position axially spaced from the predetermined position.

12. The bicycle wheel securing structure according to claim 1, wherein
the retaining arrangement includes a projection and a plurality of axially spaced recesses that selectively engage the projection when the shaft member is in a plurality of axially spaced positions.

13. The bicycle wheel securing structure according to claim 1, wherein
the shaft member includes an outer shaft and an inner shaft at least partially disposed within an internal bore of the outer shaft.

14. The bicycle wheel securing structure according to claim 13, wherein
the shaft member includes a fixing structure disposed between the outer shaft and the inner shaft to releasably prevent relative axial movement of the inner shaft from the internal bore.

15. The bicycle wheel securing structure according to claim 14, wherein
the shaft member includes the fixing structure disposed between the outer shaft and the inner shaft to releasably prevent relative rotation of the inner shaft within the internal bore.

16. A bicycle wheel securing structure comprising:
a hub axle having an axially extending through bore;
a shaft member disposed within the through bore of the hub axle, the shaft member including a first attachment end, a second attachment end and a center axis extending between the first and second attachment ends, the shaft member having an axial length measured between the first and second attachment ends that is longer than an axial length of the hub axle, the first attachment end of the shaft member being threaded, and the second attachment end of the shaft member including a head member and a lever member, which cooperate to move the first attachment end axially closer to the head member in response to movement of the lever member; and
a retaining arrangement disposed with respect to the hub axle and the shaft member, which axially overrideably prevents the shaft member from being axially removed from the hub axle when in a predetermined position within the through bore of the hub axle, the retaining arrangement being movable between an engagement position and a non-engagement position with the retaining arrangement being biased toward the engagement position from the non-engagement position.

17. A bicycle wheel securing structure comprising:
a hub axle having an axially extending through bore;
a shaft member disposed within the through bore of the hub axle, the shaft member including a first attachment end, a second attachment end and a center axis extending between the first and second attachment ends, the shaft member having an axial length measured between the first and second attachment ends that is longer than an axial length of the hub axle; and
a retaining arrangement disposed with respect to the hub axle and the shaft member, which axially overrideably prevents the shaft member from being axially removed from the hub axle when in a predetermined position within the through bore of the hub axle,
the retaining arrangement including a retaining member having an annular ring section and a retaining section that extends radially from the annular ring section to form a projection, the annular ring section being constructed of an elastically deformable material to normally bias the projection toward an engagement position from a non-engagement position, the retaining member being movable from the engagement position to the non-engagement position in response to relative movement of the shaft member with respect to the hub axle.

18. A bicycle wheel securing shaft structure arranged and configured to be inserted into a bicycle hub assembly having a hub axle with an axially extending through bore, the bicycle wheel securing shaft structure comprising:
a shaft member configured and arranged to be disposed within the through bore of the hub axle, the shaft member including a first attachment end, a second attachment end and a center axis extending between the first and second attachment ends, the shaft member having an axial length measured between the first and second attachment ends that is longer than an axial length of the hub axle; and
a retaining arrangement arranged to releasably restrict relative axial movement between the shaft member and the hub axle when the shaft is disposed in the through bore of the hub axle in a predetermined position so that unintended displacement of the wheel securing shaft structure from the hub axle is prevented during use of the wheel securing shaft structure, the retaining arrangement being movably mounted to move from an engagement position to a non-engagement position in response to relative movement of the shaft member with respect to the hub axle, with the retaining arrangement being biased toward the engagement position from the non-engagement position.

19. The bicycle wheel securing shaft structure according to claim 18, wherein
the retaining arrangement includes a retaining member coupled to the shaft member, the retaining member including a projection that projects radially outwardly from an outer surface thereof in an engagement position and which is movable to be aligned with the outer surface in a non-engagement position.

* * * * *